US010424050B2

(12) United States Patent
Shimizu

(10) Patent No.: US 10,424,050 B2
(45) Date of Patent: Sep. 24, 2019

(54) IMAGE PROCESSING APPARATUS AND IMAGE PROCESSING METHOD

(71) Applicant: Sony Semiconductor Solutions Corporation, Kanagawa (JP)

(72) Inventor: Akira Shimizu, Saitama (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 14/890,138

(22) PCT Filed: May 8, 2014

(86) PCT No.: PCT/JP2014/062296
§ 371 (c)(1),
(2) Date: Nov. 9, 2015

(87) PCT Pub. No.: WO2014/185319
PCT Pub. Date: Nov. 20, 2014

(65) Prior Publication Data
US 2016/0086312 A1 Mar. 24, 2016

(30) Foreign Application Priority Data
May 15, 2013 (JP) ................................ 2013-102669

(51) Int. Cl.
*G06T 3/40* (2006.01)
*H04N 7/01* (2006.01)
(Continued)

(52) U.S. Cl.
CPC .......... *G06T 3/4076* (2013.01); *H04N 7/012* (2013.01); *H04N 19/40* (2014.11);
(Continued)

(58) Field of Classification Search
None
See application file for complete search history.

(56) References Cited

U.S. PATENT DOCUMENTS 7,228,129 B1 * 6/2007 Ward .................... G08C 17/02
455/115.1
7,387,389 B2 * 6/2008 Gupta .................... G03B 21/26
348/445

(Continued)

FOREIGN PATENT DOCUMENTS

JP 5034554 B2 * 9/2012
JP 2012-253667 A 12/2012

OTHER PUBLICATIONS

Machine Translation of JP-2002209191 (Jul. 26, 2002).*

(Continued)

*Primary Examiner* — Michelle M Entezari
(74) *Attorney, Agent, or Firm* — Michael Best & Friedrich LLP

(57) ABSTRACT

[Object]To avoid an image quality deterioration due to image processing while maintaining a resolution of an image in a variable-rate-controlled stream.
[Solving Means]An image processing apparatus includes a resolution acquisition section, an image enlargement and reduction section, and an image conversion section. The resolution acquisition section acquires a resolution of each of a plurality of temporally-consecutive images. An enlargement and reduction percentage generation section generates an enlargement and reduction percentage for each of the plurality of images based on the acquired resolution. The image enlargement and reduction section performs image enlargement and reduction processing on each of the plurality of images according to the generated enlargement and reduction percentage. The image conversion section performs image conversion processing on each of the plurality of images subjected to the image enlargement and reduction processing.

8 Claims, 11 Drawing Sheets

(51) Int. Cl.
*H04N 21/24* (2011.01)
*H04N 21/4402* (2011.01)
*H04N 19/40* (2014.01)

(52) U.S. Cl.
CPC . *H04N 21/2402* (2013.01); *H04N 21/440263* (2013.01); *H04N 21/440281* (2013.01)

(56) References Cited

U.S. PATENT DOCUMENTS

| | | | | |
|---|---|---|---|---|
| 7,859,574 B1* | 12/2010 | Alvarez | | H04N 19/176 348/220.1 |
| 8,189,031 B2* | 5/2012 | Kim | | G06T 3/4038 348/36 |
| 8,380,010 B2* | 2/2013 | Rubenstein | | G06T 3/0012 358/1.2 |
| 8,456,571 B1* | 6/2013 | Taylor | | H04N 7/0122 348/445 |
| 8,625,893 B2* | 1/2014 | Matsumoto | | G06T 5/002 382/167 |
| 8,687,923 B2* | 4/2014 | Lin | | G06T 3/4053 382/298 |
| 2002/0191112 A1* | 12/2002 | Akiyoshi | | H04N 19/142 348/700 |
| 2003/0026457 A1* | 2/2003 | Nahum | | G06K 9/6203 382/106 |
| 2003/0123547 A1* | 7/2003 | Song | | H04N 19/56 375/240.13 |
| 2004/0136611 A1* | 7/2004 | Reiners | | G06K 9/6203 382/291 |
| 2005/0013509 A1* | 1/2005 | Samadani | | G06T 3/4023 382/302 |
| 2007/0038084 A1* | 2/2007 | Burla | | A61B 5/02007 600/437 |
| 2007/0147494 A1* | 6/2007 | Shimauchi | | H04N 19/29 375/240.1 |
| 2007/0194118 A1* | 8/2007 | Powell | | G06K 7/10722 235/454 |
| 2008/0247654 A1* | 10/2008 | Morikawa | | G11B 27/28 382/232 |
| 2009/0100493 A1* | 4/2009 | Jones | | H04N 21/235 725/131 |
| 2009/0103603 A1* | 4/2009 | Hamano | | H04N 21/235 375/240.01 |
| 2009/0185621 A1* | 7/2009 | Cho | | H04N 19/176 375/240.16 |
| 2009/0190846 A1* | 7/2009 | Mevissen | | G06T 3/0012 382/236 |
| 2010/0008423 A1* | 1/2010 | Namboodiri | | H04N 19/56 375/240.16 |
| 2011/0002549 A1* | 1/2011 | Ohmori | | G06K 9/6203 382/218 |
| 2011/0235944 A1* | 9/2011 | Ernst | | G06T 3/4007 382/299 |
| 2011/0238426 A1* | 9/2011 | Fuchs | | G10L 19/0017 704/500 |
| 2011/0254929 A1* | 10/2011 | Yang | | G02B 27/2264 348/51 |
| 2012/0050822 A1* | 3/2012 | Motoyama | | H04N 1/40068 358/451 |
| 2012/0268651 A1* | 10/2012 | Baker | | G06T 3/4023 348/445 |
| 2013/0051767 A1* | 2/2013 | Soroushian | | H04N 19/33 386/248 |
| 2013/0089154 A1* | 4/2013 | Chen | | H04N 19/70 375/240.25 |
| 2013/0265311 A1* | 10/2013 | Na | | G06T 3/40 345/428 |
| 2013/0291031 A1* | 10/2013 | Dow | | H04N 21/234327 725/93 |
| 2013/0335539 A1* | 12/2013 | Seo | | H04N 13/0438 348/56 |
| 2014/0111454 A1* | 4/2014 | Hosoi | | H04M 1/72527 345/173 |
| 2014/0143298 A1* | 5/2014 | Klotzer | | H04L 67/2823 709/203 |
| 2014/0241420 A1* | 8/2014 | Orton-Jay | | H04N 19/176 375/240.03 |

OTHER PUBLICATIONS

Li, Y. Y and Wei, C.H., Jul. 2011. Hierarchical correlation for content-based image retrieval. In&snsp;Multimedia Technology (ICMT), 2011 International Conference on&mbsp;(pp. 550-553). IEEE. (Year: 2011).*

Machine Translation JP-5034554-B2 (Year: 2012).*

* cited by examiner

IMAGE PROCESSING APPARATUS AND IMAGE PROCESSING METHOD

TECHNICAL FIELD

The present technique relates to an image processing apparatus and an image processing method, more specifically, to an image processing apparatus and an image processing method for performing image processing on an image included in a variable-rate-controlled stream.

BACKGROUND ART

In recent years, a delivery system that delivers various contents by variable-rate-controlled streams has prevailed. In such a delivery system, when a stream is delivered as an interlace image in which one frame is divided into two fields, there is a need to convert the image into a progressive image on a reception side. In addition, processing for reducing noises included in an image is carried out on the reception side in many cases. For example, there is proposed an image processing apparatus that performs an interlace/progressive conversion or noise reduction processing in accordance with an image signal appearance pattern (see, for example, Patent Document 1).

Patent Document 1: Japanese Patent Application Laid-open No. 2012-253667

SUMMARY OF INVENTION

Problem to be Solved by the Invention

In a variable-rate-controlled stream, a resolution of an image varies depending on a state of a communication line. Since the state of a communication line varies irrespective of an image scene, the resolution also varies irrespective of the image scene. On the other hand, while the interlace/progressive conversion or noise reduction processing is carried out on an image included in the stream as described above, it is desirable to reference not only a target image but also other images at this time. However, when the resolution is changed, other images cannot be referenced and image processing is carried out by interpolation processing within the target image, with the result that an image quality is impaired. Particularly in a service of video on demand and the like, a deterioration due to the interlace/progression conversion or noise reduction processing is apt to occur at a reproduction start time or in a time slot where communication lines are jammed.

The present technique has been made in view of the circumstances as described above and aims at avoiding a deterioration of an image quality due to image processing while maintaining a resolution of an image in a variable-rate-controlled stream.

Means for Solving the Problem

The present technique has been made to solve the problem described above, and according to a first aspect, there is provided an image processing apparatus including: a resolution acquisition section that acquires a resolution of each of a plurality of temporally-consecutive images; an enlargement and reduction percentage generation section that generates an enlargement and reduction percentage for each of the plurality of images based on the acquired resolution; an image enlargement and reduction section that performs image enlargement and reduction processing on each of the plurality of images according to the generated enlargement and reduction percentage; and an image conversion section that performs image conversion processing on each of the plurality of images subjected to the image enlargement and reduction processing, and an image processing method therefor. Accordingly, an operation of maintaining a resolution of an image as a target of the image conversion processing by performing the image enlargement and reduction processing according to the resolution of an input image can be obtained.

Further, according to the first aspect, the image processing apparatus may further include a position detection section that detects a position at which a correlation degree is lowered in the plurality of images, and the enlargement and reduction percentage generation section may initialize the enlargement and reduction percentage at the position at which the correlation degree is lowered. With this structure, an operation of suppressing unnecessary image enlargement and reduction processing not contributing to the image conversion processing can be obtained.

Further, according to the first aspect, the enlargement and reduction percentage generation section may initialize the enlargement and reduction percentage when the enlargement and reduction percentage based on the acquired resolution exceeds a predetermined range. With this structure, an operation of preventing an image quality deterioration due to excessive image enlargement and reduction processing can be obtained.

Also in this case, the image processing apparatus may further include an enlargement and reduction percentage storage section that stores a history of the generated enlargement and reduction percentage, and the enlargement and reduction percentage generation section may generate, even when the enlargement and reduction percentage based on the acquired resolution exceeds the predetermined range, the enlargement and reduction percentage without initialization when it is judged that the state exceeding the predetermined range is temporary based on the history of the enlargement and reduction percentage stored in the enlargement and reduction percentage storage section. With this structure, an operation of performing a hysteresis operation so as not to excessively react to a temporary fluctuation can be obtained.

Further, according to the first aspect, the image conversion section may perform the image conversion processing that uses each of the plurality of images as a target image by referencing, when other images temporally close to the target image have a correlation with the target image, the target image and the other images, and perform the image conversion processing by interpolating the target image when the other images have no correlation with the target image. With such a presupposition, an operation of maintaining a resolution of an image as a target of the image conversion processing by performing the image enlargement and reduction processing according to the resolution of an input image can be obtained.

Further, according to the first aspect, each of the plurality of images may be an interlace image, and the image conversion section may include, as the image conversion processing, processing of converting the interlace image into a progressive image. In addition, the image conversion section may include, as the image conversion processing, processing of reducing noises for each of the plurality of images.

Effect of the Invention

According to the present technique, it is possible to obtain an excellent effect of avoiding an image quality deterioration due to image processing while maintaining a resolution of an image in a variable-rate-controlled stream.

MODES FOR CARRYING OUT THE INVENTION

Hereinafter, forms for embodying the present technique (hereinafter, referred to as embodiments) will be described. The descriptions will be made in the following order.

1. First embodiment (image enlargement and reduction with respect to change in resolution)
2. Second embodiment (image enlargement and reduction suppression at time of scene change)
3. Third embodiment (image enlargement and reduction suppression with respect to precipitous change in resolution)
4. Fourth embodiment (hysteresis operation with respect to temporary change in resolution)

<1. First Embodiment>
[Structure of Image Display Apparatus]

Figure 1:
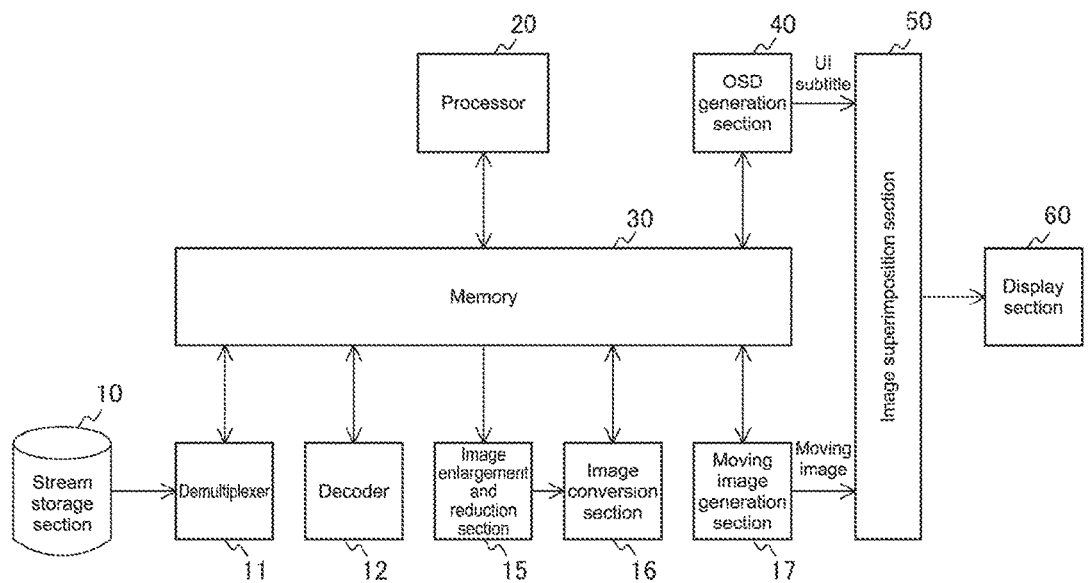
FIG. 1 A diagram showing a structural example of an image display apparatus according to an embodiment of the present technique.

FIG. 1. is a diagram showing a structural example of an image display apparatus according to an embodiment of the present technique. The image display apparatus receives a variable-rate-controlled stream via a communication line and displays an image included in the stream. The image display apparatus is constituted of a stream storage section 10, a demultiplexer 11, a decoder 12, an image enlargement and reduction section 15, an image conversion section 16, a moving image generation section 17, a processor 20, a memory 30, an OSD generation section 40, an image superimposition section 50, and a display section 60. A portion constituted of the processor 20, the memory 30, the image enlargement and reduction section 15, and the image conversion section 16 will be referred to as image processing apparatus in particular.

The stream storage section 10 stores a stream received via a communication line. For example, bit streams of an MPEG-2 system or H.264/AVC are transmitted and stored as transport streams and program streams.

The demultiplexer 11 separates an image, audio, data, and the like multiplexed in a stream stored in the stream storage section 10 and stores them in the memory 30.

The decoder 12 decodes the image separated by the demultiplexer 11. For example, an MPEG-2 or AVC digital decoder is assumed.

The image enlargement and reduction section 15 carries out image enlargement processing or image reduction processing (hereinafter, referred to as image enlargement and reduction processing) on the image decoded by the decoder 12.

The image conversion section 16 carries out image conversion processing on the image subjected to the image enlargement and reduction processing by the image enlargement and reduction section 15. Here, the image conversion processing assumes IP conversion (Interlace/Progressive conversion) processing of converting an interlace image into a progressive image, noise reduction (NR: Noise Reduction) processing of reducing noises from an image, and the like.

The moving image generation section 17 generates a moving image in a size matching a panel size of the display section 60 by performing scaling processing on the image subjected to the image conversion processing by the image conversion section 16.

The OSD generation section 40 generates an OSD (On Screen Display) image. The OSD image is superimposed on a moving image generated by the moving image generation section 17 and assumes, for example, a user interface image, a subtitle image, a data broadcast service, and the like.

The image superimposition section 50 superimposes the OSD image generated by the OSD generation section 40 onto the moving image generated by the moving image generation section 17. The superimposition processing of the image superimposition section 50 assumes α blend processing, for example.

The processor 20 controls series of processing of the image display apparatus.

The memory 30 stores an image, audio, data, and the like generated in the image display apparatus and assumes DRAM such as DDR, for example.

The display section 60 displays an image subjected to the superimposition processing by the image superimposition section 50. An example of the display section 60 is a display such as an LCD (Liquid Crystal Display).

Figure 2:
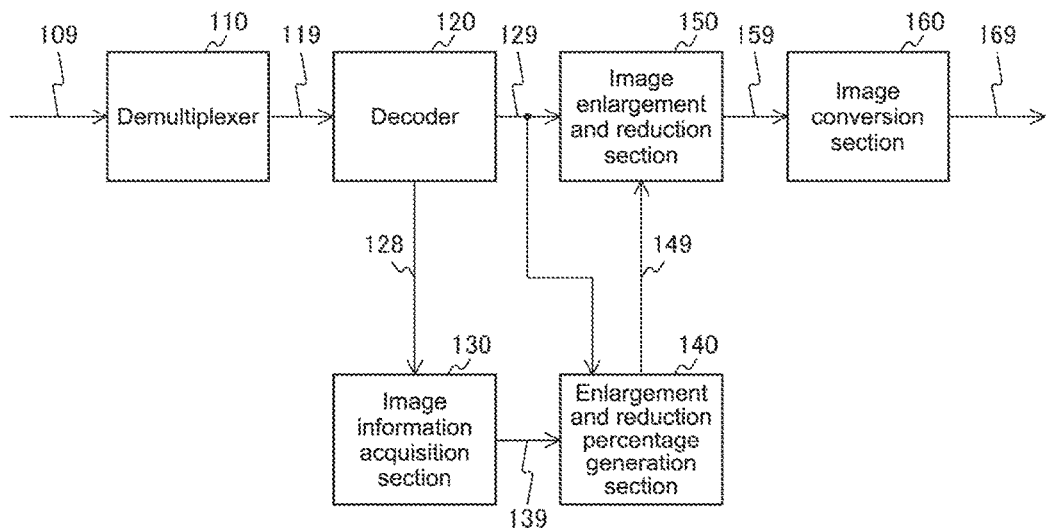
FIG. 2 A diagram showing a functional structural example of main sections of the image display apparatus according to the embodiment of the present technique.

FIG. 2 is a diagram showing a functional structural example of main sections of the image display apparatus according to the embodiment of the present technique. Here, a demultiplexer 110, a decoder 120, an image enlargement and reduction section 150, and an image conversion section 160 are illustrated as the functions of the demultiplexer 11, the decoder 12, the image enlargement and reduction section 15, and the image conversion section 16. In addition, an image information acquisition section 130 and an enlargement and reduction percentage generation section 140 are illustrated as the functions of the processor 20. Moreover, although the functional structures are illustrated as being connected directly, they may be temporarily stored in the memory 30 in the image display apparatus.

The demultiplexer 110 separates a multiplexed image, audio, data, and the like in a stream input from a signal line 109 and outputs them to a signal line 119.

The decoder 120 decodes the image input by the signal line 119 and outputs it to a signal line 129. The decoder 120 also decodes the data input by the signal line 119 and outputs it to a signal line 128.

The image information acquisition section 130 acquires image information from the data input by the signal line 128 and outputs it to a signal line 139. Here, the image information assumes information related to a resolution of an image to be described later. It should be noted that the image information acquisition section 130 is an example of a resolution acquisition section.

The enlargement and reduction percentage generation section 140 generates an enlargement and reduction percentage of an image based on the image information input by the signal line 139 and the image input by the signal line 129 and outputs it to a signal line 149.

The image enlargement and reduction section 150 carries out image enlargement and reduction processing on the image input by the signal line 129 in accordance with the enlargement and reduction percentage input by the signal line 149 and outputs it to a signal line 159. When the enlargement and reduction percentage generated by the enlargement and reduction percentage generation section 140 is larger than "1", the image enlargement and reduction section 150 enlarges the image output from the signal line 129. On the other hand, when the enlargement and reduction percentage generated by the enlargement and reduction percentage generation section 140 is smaller than "1", the image enlargement and reduction section 150 reduces the image output from the signal line 129. Moreover, when the enlargement and reduction percentage generated by the enlargement and reduction percentage generation section 140 is equal to "1", the image enlargement and reduction section 150 does not enlarge nor reduce the image.

The image conversion section 160 carries out the image conversion processing on the image input by the signal line 159 and outputs it to a signal line 169.

Figure 3:
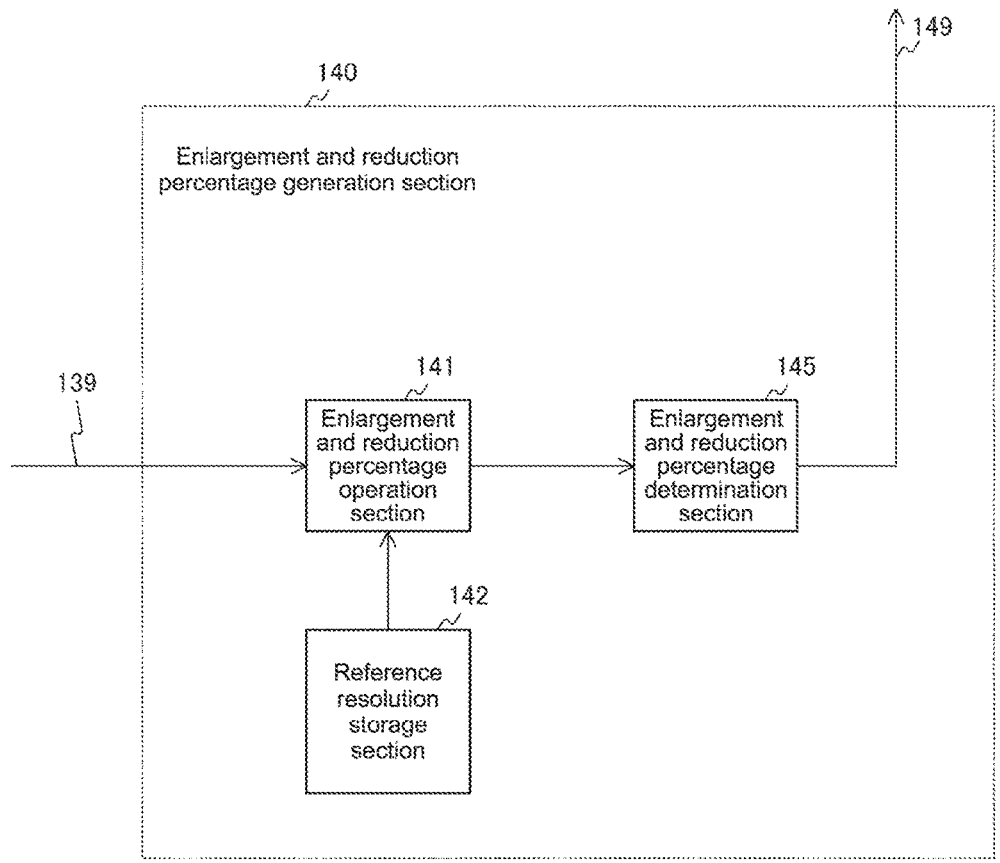
FIG. 3 A diagram showing a structural example of an enlargement and reduction percentage generation section 140 according to a first embodiment of the present technique.

FIG. 3 is a diagram showing a structural example of the enlargement and reduction percentage generation section 140 according to a first embodiment of the present technique. The enlargement and reduction percentage generation section 140 of the first embodiment includes an enlargement and reduction percentage operation section 141, a reference resolution storage section 142, and an enlargement and reduction percentage determination section 145. It should be noted that in the first embodiment, image information input by the signal line 139 is not used.

The reference resolution storage section 142 stores a reference resolution used for the enlargement and reduction. For example, when so-called Full Hi-Vision is used as a reference, "1920" is stored as a pixel count in a lateral direction, and "1080" is stored as a pixel count in a longitudinal direction. Alternatively, the pixel count in the longitudinal or lateral direction and an aspect ratio may be stored.

The enlargement and reduction percentage operation section 141 calculates the enlargement and reduction percentage based on the image information acquired by the image information acquisition section 130 and the resolution stored in the reference resolution storage section 142. Specifically, the enlargement and reduction percentage operation section 141 calculates the enlargement and reduction percentage from a ratio of the pixel counts in the longitudinal and lateral directions. For example, when the reference resolution stored in the reference resolution storage section 142 is "1920" pixels in the lateral direction and "1080" pixels in the longitudinal direction, if the acquired image information is "1280" pixels in the lateral direction and "720" pixels in the longitudinal direction, the enlargement and reduction percentage is "1.5"-folds in both the longitudinal and lateral directions. On the other hand, when the aspect ratio does not match, the enlargement and reduction percentage differs for each direction. For example, when the acquired image information is "720" pixels in the lateral direction and "480" pixels in the longitudinal direction with respect to the reference resolution described above, the enlargement and reduction percentage to be acquired is "2.66"-folds in the lateral direction and "2.25"-folds in the longitudinal direction. At this time, if the aspect ratio is not to be maintained, different enlargement and reduction percentages may be used. When maintaining the aspect ratio, the longitudinal and lateral directions are enlarged/reduced based on the enlargement and reduction percentage in either the longitudinal direction or the lateral direction.

The enlargement and reduction percentage determination section 145 determines the enlargement and reduction percentage to be instructed to the image enlargement and reduction section 150 based on the enlargement and reduction percentage calculated by the enlargement and reduction percentage operation section 141. In the enlargement and reduction percentage generation section 140 according to the first embodiment, the enlargement and reduction percentage determination section 145 determines, as the enlargement and reduction percentage to be instructed to the image enlargement and reduction section 150, the enlargement and reduction percentage calculated by the enlargement and reduction percentage operation section 141 as it is.

[Data Structure of Image Information]

Figure 4:
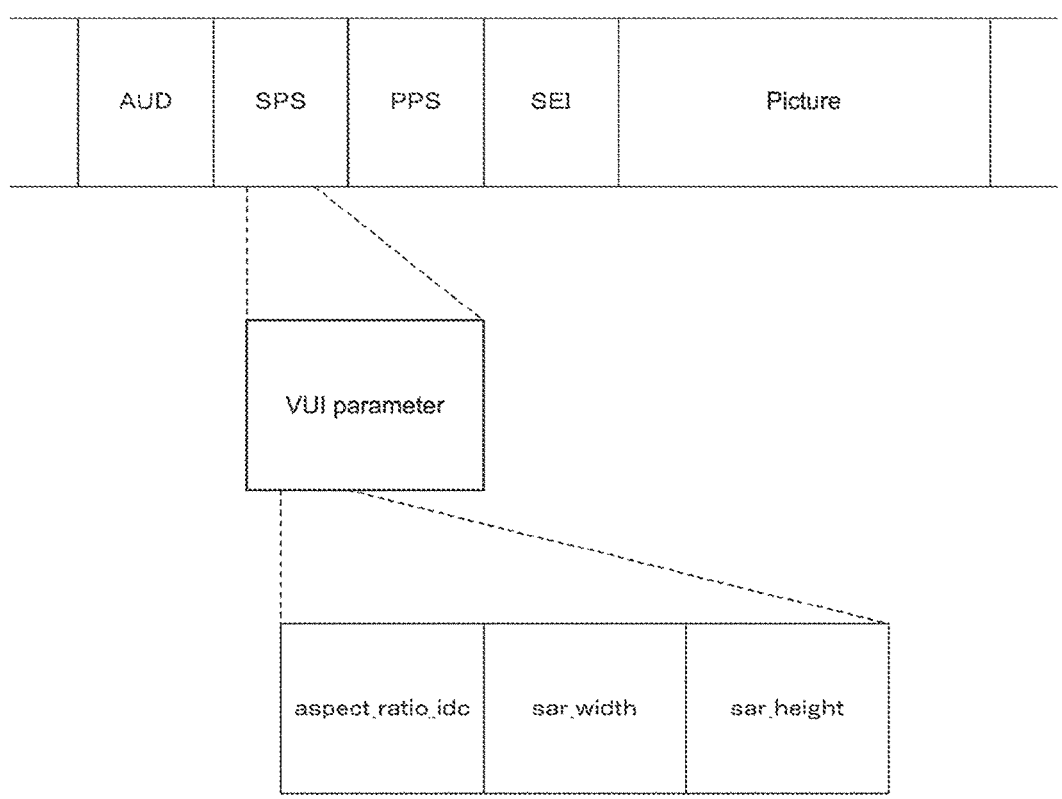
FIG. 4 A diagram showing an example of image information acquired by an image information acquisition section 130 according to the embodiment of the present technique.

FIG. 4 is a diagram showing an example of the image information acquired by the image information acquisition section 130 according to the embodiment of the present technique. In this embodiment, a plurality of temporally-consecutive images are transmitted as bit streams. Here, using H.264/AVC as an example, a data structure of an access unit is shown. In H.264/AVC, for accessing bit stream information in a picture unit, an access unit is defined as a compiled section of a plurality of NAL units.

The access unit includes, starting from AUD (Access Unit Delimiter) indicating a head of the access unit, a picture as a data body subsequent to headers of SPS, PPS, and SEI. SPS (Sequence Parameter Set) is a header including information on encoding of an entire moving image sequence. PPS (Picture Parameter Set) is a header including an encoding mode of the entire picture. SEI (Supplemental Enhancement Information) is a header including supplemental information such as timing information of a picture.

SPS transmits a VUI (Video Usability Information) parameter as one of the parameters. The VUI parameter is a parameter of information usable for displaying a moving image. In this embodiment, out of the VUI parameters, aspect_ratio_idc, sar_width, and sar_height may be referenced in particular.

aspect_ratio_idc is obtained by encoding a pixel aspect ratio. When aspect_ratio_idc indicates "255", the pixel aspect ratio (SAP: Sample Aspect Ratio) is calculated from sar_width and sar_height. sar_width is a size of the pixel aspect ratio in the lateral direction (horizontal, direction), and sar_height is a size of the pixel aspect ratio in the longitudinal direction (vertical direction). Therefore, the image information acquisition section 130 can acquire requisite image information by referencing the VUI parameters in SPS of the access unit.

[Processing Procedure of Enlargement and Reduction Percentage Generation Processing]

Figure 5:
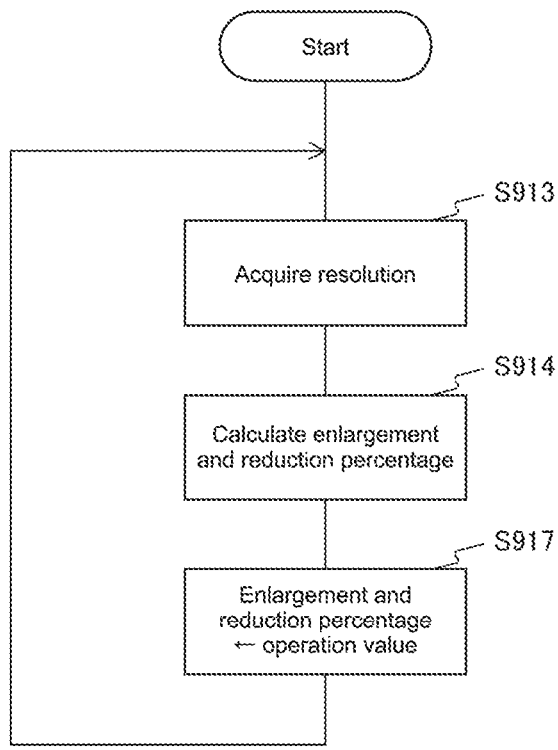
FIG. 5 A flowchart showing an example of a processing procedure of enlargement and reduction percentage generation processing according to the first embodiment of the present technique.

FIG. 5 is a flowchart showing an example of a processing procedure of enlargement and reduction percentage generation processing according to the first embodiment of the present technique.

For one of a plurality of images included in a bit stream, a resolution is acquired by the image information acquisition section 130 (Step S913). Then, by dividing the reference resolution stored in the reference resolution storage section 142 by the acquired resolution in the enlargement and reduction percentage operation section 141, the enlargement and reduction percentage is calculated (Step S914).

The enlargement and reduction percentage determination section 145 determines the enlargement and reduction percentage calculated by the enlargement and reduction percentage operation section 141 as it is as the enlargement and reduction percentage to be instructed to the image enlargement and reduction section 150 (Step S917).

Those processing are sequentially repeated in time series for the plurality of images included in a bit stream.

[Processing Procedure of Image Conversion Processing]

Figure 6:
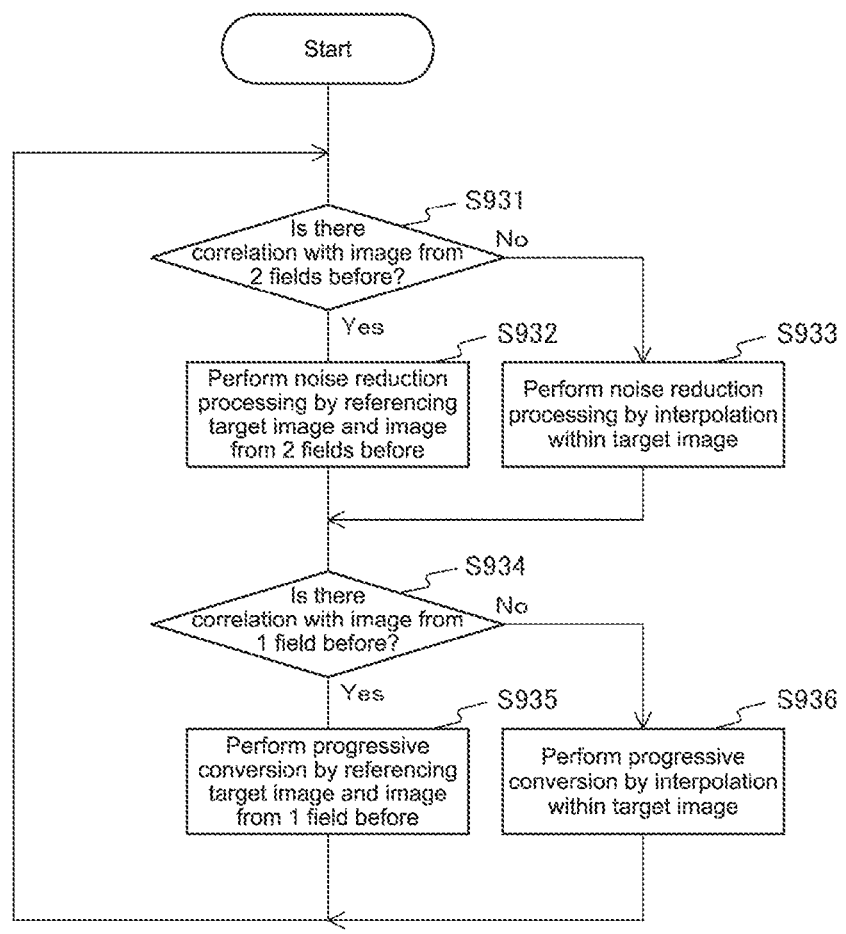
FIG. 6 A flowchart showing an example of a processing procedure of image conversion processing according to the embodiment of the present technique.

FIG. 6 is a flowchart showing an example of a processing procedure of image conversion processing according to the embodiment of the present technique. Here, it is assumed that the image conversion processing is carried out sequentially in time series using each of a plurality of temporally-consecutive interlace images as a target image.

First, for carrying out noise reduction processing, a correlation degree between a target image and an interlace image 2 fields before the target image is judged (Step S931). When judged that there is a correlation (Step S931: Yes), the noise reduction processing is carried out by referencing the interlace image from 2 fields before and the target image (Step S932). On the other hand, when judged that there is no correlation (Step S931: No), the noise reduction processing is carried out by an interpolation within the target image (Step S933). In this case, there is a fear that an image quality deteriorates as compared to the processing carried out by referencing the interlace image from 2 fields before.

Next, for carrying out conversion processing from an interlace image to a progressive image, a correlation degree between a target image and an interlace image from 1 field before the target image is judged (Step S934). When judged that there is a correlation. (Step S934: Yes), the conversion processing to a progressive image is carried out by referencing the interlace image from 1 field before and the target image (Step S935). On the other hand, when judged that there is no correlation (Step S934: No), the conversion processing to a progressive image is carried out by an interpolation within the target image (Step S936). In this case, there is a fear that an image quality deteriorates as compared to the processing carried out by referencing the interlace image from 1 field before,

[Timing of Image Conversion Processing]

Figure 7:
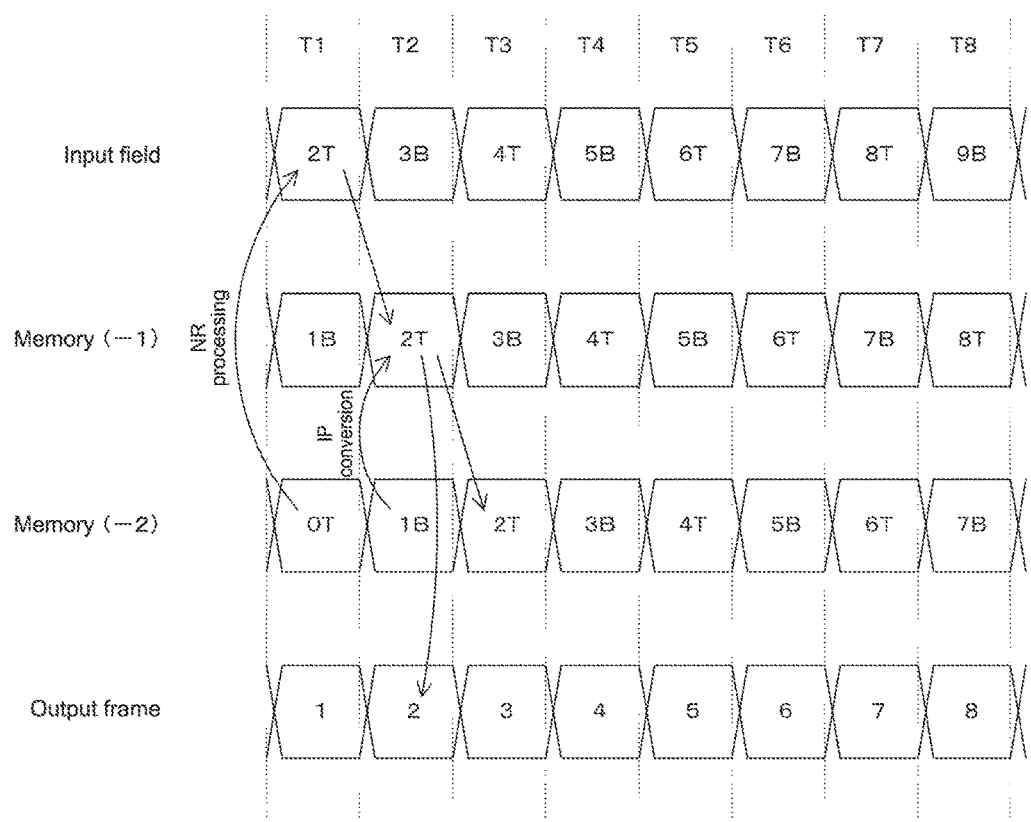
FIG. 7 A diagram showing a timing example of the image conversion processing according to the embodiment of the present technique.

FIG. 7 is a diagram showing a timing example of the image conversion processing according to the embodiment of the present technique. In the figure, the lateral direction indicates a time lapse. The upper stage shows a state where a field image is input as a target image. The input field image is subjected to the noise reduction processing (NP processing), and at least 2 fields of images are stored in the memory 30 as shown in the mid stages. It should be noted that the symbol "T" attached after the numeral of each image number indicates that the image is an interlace image of the upper (Top) field, and the symbol "B" indicates that the image is an interlace image of the lower (Bottom) field.

The image conversion section 160 carries out the noise reduction processing and the IP conversion processing as described above by referencing the interlace image stored in the memory 30 as much as possible. Upon ending the IP conversion processing, the progressive image is output for each frame as shown in the lower stage.

Here, a case where a resolution is lowered from an interlace image 7B input at a time T6 along with the variable frame rate control will be described, for example. In this case, assuming that the enlargement and reduction processing by the image enlargement and reduction section 150 is not carried out as in the related art, it is judged that there is no correlation with the interlace image 5B from 2 fields before. Therefore, the noise reduction processing is carried out by an interpolation within the interlace image 7B. Similarly, since it is judged that there is no correlation with the interlace image 6T from 1 field before, the IP conversion processing is carried out by an interpolation within the interlace image 7B.

In contrast, in the embodiment of the present technique, the enlargement and reduction processing of the interlace image 7B is carried out by the image enlargement and reduction section 150 along with the lowering of a resolution. Therefore, since the correlation with the interlace image 5B from 2 fields before is maintained, the noise reduction processing is carried out by referencing the interlace images 5B and 7B. Further, since the correlation is also maintained with the interlace image 6T from 1 field before, the IP conversion processing is carried out by referencing the interlace images 5B and 6T.

As described above, according to the first embodiment of the present technique, even when the resolution of an input image is lowered along with the variable frame rate control, a correlation with a preceding image is maintained by the enlargement and reduction processing by the image enlargement and reduction section 150, and therefore a deterioration due to the image processing can be avoided.

<2. Second Embodiment>

In the first embodiment described above, even when the resolution of an input image is lowered, the correlation with a preceding image is maintained by carrying out the enlargement and reduction processing. In contrast, when a content of an image is largely changed by a scene change, for example, the correlation with a preceding image cannot be maintained eve when the enlargement and reduction processing is carried out. In this regard, in a second embodiment, when a scene change occurs, the enlargement and reduction percentage is initialized so that a suppression to not perform the enlargement and reduction is made. It should be noted that since the basic structures shown in FIGS. 1 and 2 are the same, descriptions thereof will be omitted.

[Structure of Image Display Apparatus]

Figure 8:
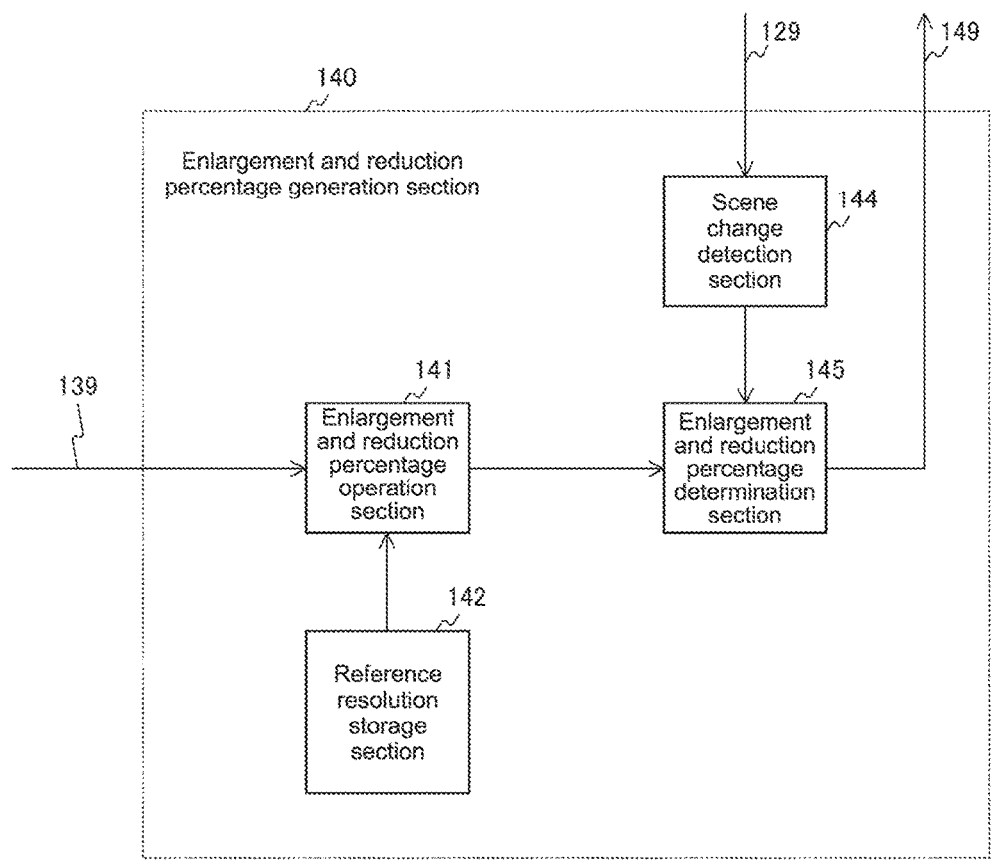
FIG. 8 A diagram showing a structural example of the enlargement and reduction percentage generation section 140 according to a second embodiment of the present technique.

FIG. 8 is a diagram showing a structural example of the enlargement and reduction percentage generation section 140 according to the second embodiment of the present technique. The enlargement and reduction percentage generation section 140 according to the second embodiment includes the enlargement and reduction percentage operation section 141, the reference resolution storage section 142, and the enlargement and reduction percentage determination section 145 as in the first embodiment and additionally includes a scene change detection section 144.

The scene change detection section 144 detects a position on a time series where a scene change has occurred for an image input by the signal line 129. Specifically, the scene change detection section 144 detects a position at which the correlation degree between images is lowered in time series. It should be noted that the scene change detection section 144 is an example of a position detection section.

When a scene change is detected by the scene change detection section 144, the enlargement and reduction percentage determination section 145 initializes the enlargement and reduction percentage to "1.0-fold" and outputs it to the signal line 149 irrespective of the operation result of the enlargement and reduction percentage operation section 141. Accordingly, unnecessary enlargement and reduction processing can be suppressed.

[Processing Procedure of Enlargement and Reduction Percentage Generation Processing]

Figure 9:
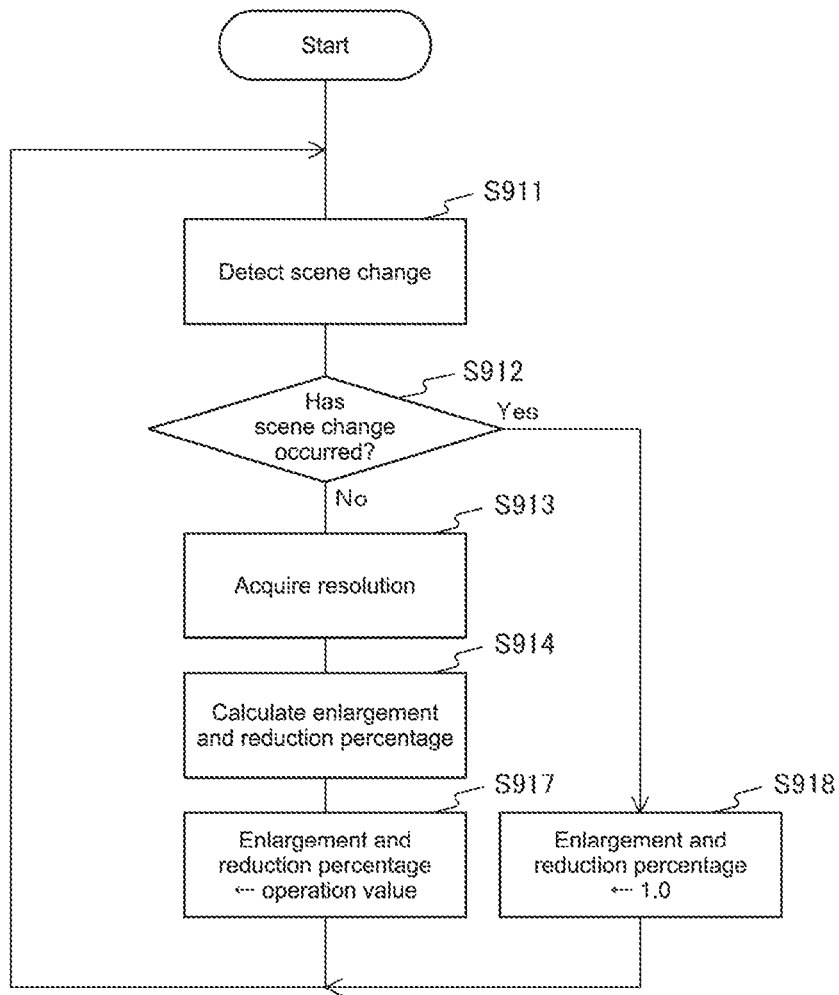
FIG. 9 A flowchart showing an example of the processing procedure of the enlargement and reduction percentage generation processing according to the second embodiment of the present technique.

FIG. 9 is a flowchart showing an example of the processing procedure of the enlargement and reduction percentage generation processing according to the second embodiment of the present technique.

With respect to one of a plurality of images included in a bit stream, detection processing for detecting a presence/absence of a scene change is carried out by the scene change detection section 144 (Step S911). Upon detecting a scene change (Step S912: Yes), the enlargement and reduction percentage determination section 145 initializes the enlargement. and reduction percentage to "1.0-fold" (Step S918).

When a scene change is not detected (Step S912: No), the same processing as in the first embodiment is carried out. Specifically, a resolution is acquired by the image information acquisition section 130 (Step S913), and the enlargement and reduction percentage calculated based on the resolution (Step S914) is determined as the enlargement and reduction percentage to be instructed to the image enlargement and reduction section 150 (Step S917).

Those processing are sequentially repeated in time series for a plurality of images included in a bit stream.

[Timing of Image Conversion Processing]

A case where a scene change occurs from an interlace image 6T input at a time T5 in FIG. 7 described above, for example, will be discussed. In this case, the IP conversion and noise reduction processing are carried out temporarily by an interpolation within an interlace image, but it is possible to reference a preceding image for the interlace image 7B and subsequent images regarding the IP conversion and the interlace image 8T and subsequent images regarding the noise reduction processing.

As described above, according to the second embodiment of the present technique, when an image content is largely changed by a scene change, for example, the enlargement and reduction percentage can be initialized so as to suppress unnecessary enlargement and reduction processing. As a result, performance of the IP conversion and noise reduction processing with respect to an image after a scene change can be improved.

<3. Third Embodiment>

In the first embodiment described above, even when the resolution of an input image is lowered, the correlation with a preceding image is maintained by carrying out the enlargement and reduction processing. In contrast, considering a case where a communication state is gradually improved by variable rate control and the resolution is raised to a high image quality, readily switching to the original resolution and carrying out the IP conversion and noise reduction processing is effective for improving an image quality. Moreover, excessive image enlargement and reduction processing causes a deterioration in the image quality. In this regard, in a third embodiment, when the enlargement and reduction percentage does not fall within a predetermined range, the enlargement and reduction percentage is initialized so that a suppression to not perform the enlargement and reduction is made. It should be noted that since the basic structures shown in FIGS. 1, 2, and 8 are the same, descriptions thereof will be omitted.

As an indication for suppressing the enlargement and reduction processing, the enlargement and reduction percentage calculated by the enlargement and reduction percentage operation section 141 is used as it is when the enlargement and reduction percentage is larger than "0.66" and smaller than "1.5", for example, and is initialized otherwise. For example, when the reference resolution is "1920" pixels in the lateral direction and "1080" pixels in the longitudinal direction and the acquired image information is "1280" pixels in the lateral direction and "720" pixels in the longitudinal direction, the enlargement and reduction percentage becomes "1.5"-fold and is outside the range in both the longitudinal and lateral directions, so the enlargement and reduction percentage is initialized. It should be noted that the range of the enlargement and reduction percentage is an example and can be set as appropriate according to the specification of the image processing apparatus.

[Processing Procedure of Enlargement and Reduction Percentage Generation Processing]

Figure 10:
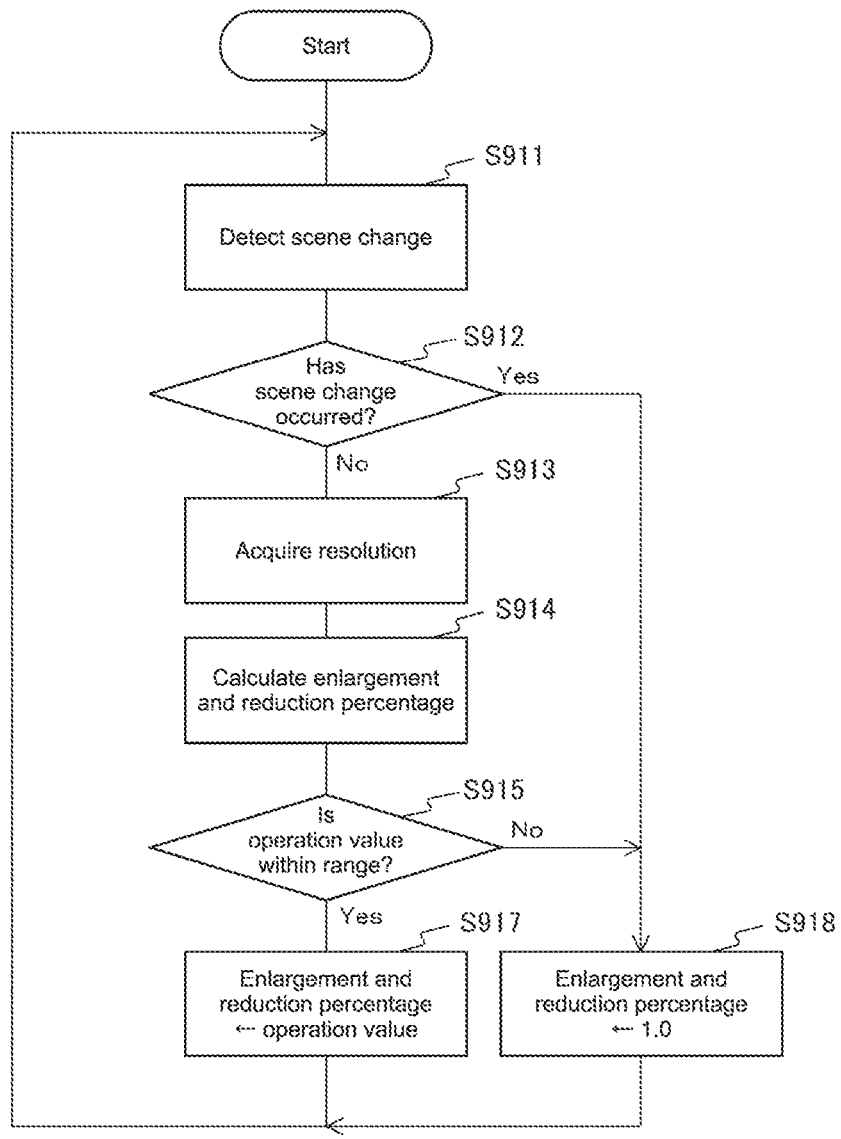
FIG. 10 A flowchart showing an example of the processing procedure of the enlargement and reduction percentage generation processing according to a third embodiment of the present technique.

FIG. 10 is a flowchart showing an example of the processing procedure of the enlargement and reduction percentage generation processing according to the third embodiment of the present technique.

The detection of a scene change is the same as that of the second embodiment. Specifically, with respect so one of a plurality of images included in a bit stream, the detection processing for detecting a presence/absence of a scene change is carried out by the scene change detection section 144 (Step S911). Upon detecting a scene change (Step S912: Yes), the enlargement and reduction percentage determination section 145 initializes the enlargement and reduction percentage to "1.0-fold" (Step S918).

When a scene change is not detected. (Step S912: No), a resolution is acquired by the image information acquisition section 130 (Step S913) as in the first embodiment, and the enlargement and reduction percentage is calculated by the enlargement and reduction percentage operation section 141 based on the resolution (Step S914). When the enlargement and reduction percentage calculated by the enlargement and reduction percentage operation section 141 is within a predetermined range (Step S915 Yes), the enlargement and reduction percentage calculated by the enlargement and reduction percentage operation section 141 is determined as the enlargement and reduction percentage to be instructed to the image enlargement and reduction section 150 (Step S917). It should be noted that when the enlargement and reduction percentage calculated by the enlargement and reduction percentage operation section 141 is not within the predetermined range (Step S915: No), the enlargement and reduction percentage determination section 145 initializes the enlargement and reduction percentage to "1.0-fold" (Step S918).

Those processing are sequentially repeated in time series for a plurality of images included in a bit stream.

[Timing of Image Conversion Processing]

A case where a resolution largely changes from the interlace image 7B input at the time T6 in FIG. 7 described above, for example, will be discussed. At this time, assuming that the enlargement and reduction percentage has exceeded the predetermined range, the enlargement and reduction percentage determination section 145 initializes the enlargement and reduction percentage to "1.0-fold". Therefore, the IP conversion and noise reduction processing are temporarily carried out by an interpolation within the interlace image. It should be noted that since it is possible to reference a preceding image for the interlace image 8T and subsequent images regarding the IP conversion and the interlace image 9B and subsequent images regarding the noise reduction processing, the image quality after that can be improved.

As described above, according to the third embodiment of the present technique, when the enlargement and reduction percentage calculated by the enlargement and reduction percentage operation section 141 is not within the predetermined range, the enlargement and reduction percentage is initialized to suppress unnecessary enlargement and reduction processing, with the result that the image quality after that can be improved.

<4. Fourth Embodiment>

In the third embodiment described above, when the enlargement and reduction percentage calculated by the enlargement and reduction percentage operation section 141 is not within the predetermined range, the enlargement and reduction percentage is initialized. In contrast, if the enlargement and reduction percentage is initialized also when a communication state instantaneously fluctuates by the variable rate control, there is a fear that an interpolation within an interlace image frequently occurs in the IP conversion and noise reduction processing to thus induce an unnecessary image deterioration. In this regard, in a fourth embodiment, a hysteresis operation for suppressing the initialization of the enlargement and reduction percentage is carried out if the fluctuation of the enlargement and reduction percentage is temporary. It should be noted that since the basic structures shown in FIGS. 1 and 2 are the same, descriptions thereof will be omitted.

[Structure of Image Display Apparatus]

Figure 11:
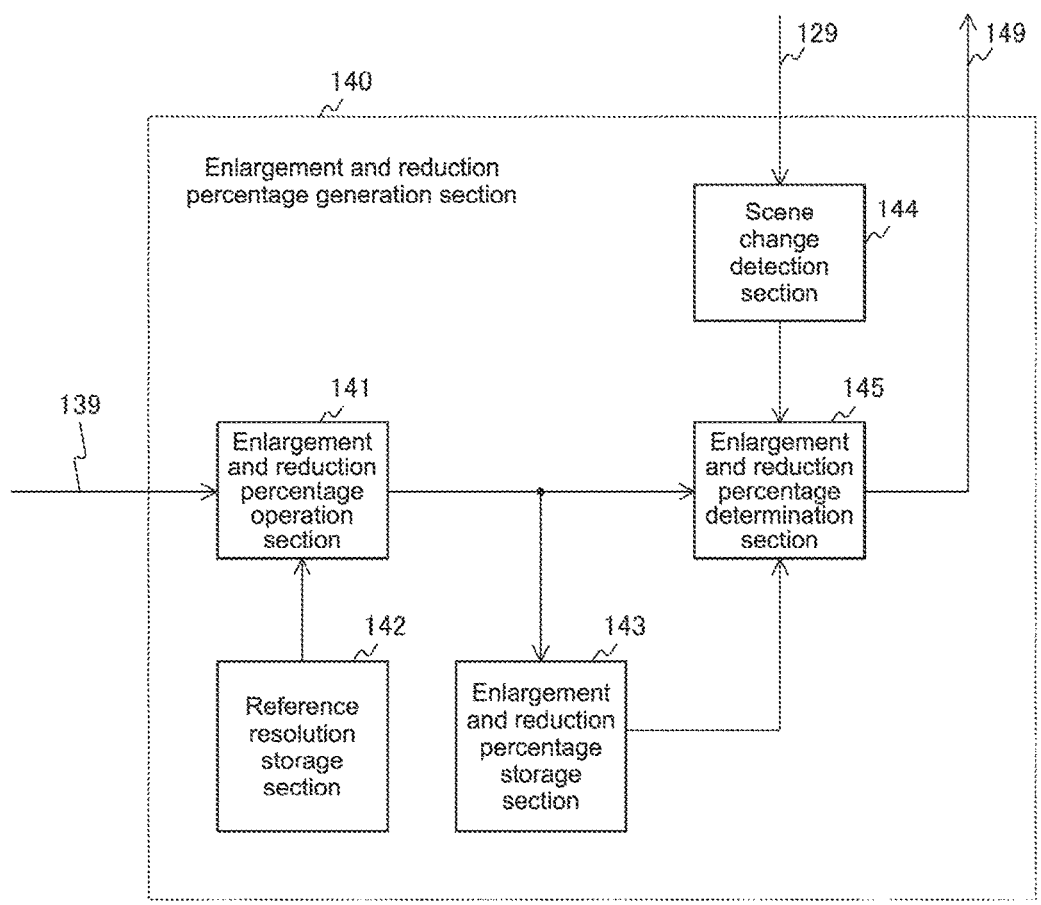
FIG. 11 A diagram showing a structural example of the enlargement and reduction percentage generation section 140 according to a fourth embodiment of the present technique.

FIG. 11 is a diagram showing a structural example of the enlargement and reduction percentage generation section 140 according to the fourth embodiment of the present technique. The enlargement and reduction percentage generation section 140 according to the fourth embodiment includes the enlargement and reduction percentage operation section 141, the reference resolution storage section 142, the scene change detection section 144, and the enlargement and reduction percentage determination section 145 as in the third embodiment and additionally includes an enlargement and reduction percentage storage section 143.

The enlargement and reduction percentage storage section 143 stores a history of the enlargement and reduction percentage calculated by the enlargement and reduction percentage operation section 141. The enlargement and reduction percentage determination section 145 references the history stored in the enlargement and reduction percentage storage section 143 and judges whether the fluctuation of the enlargement and reduction percentage is temporary.

For example, even when it is once detected that the enlargement and reduction percentage calculated by the enlargement and reduction percentage operation section 141 is non within the predetermined range, if such a state is not detected consecutively, the enlargement and reduction percentage is not initialized at once. On the other hand, when it is consecutively judged a plurality of times that the enlargement and reduction percentage calculated by the enlargement and reduction percentage operation section 141 is not within the predetermined range (e g., twice), control to initialize the enlargement and reduction percentage may be performed.

[Processing Procedure of Enlargement and Reduction Percentage Generation Processing]

Figure 12:
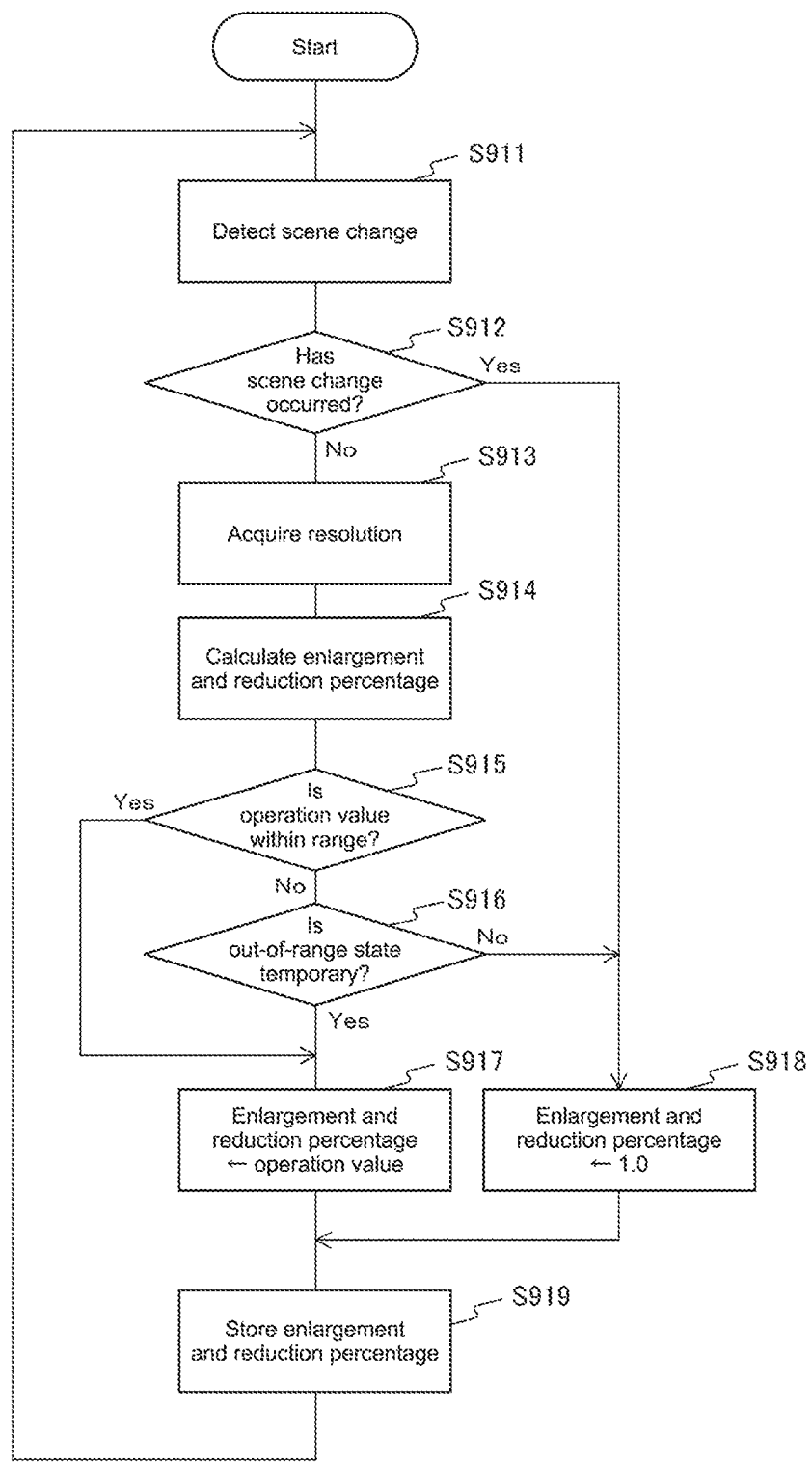
FIG. 12 A flowchart showing an example of the processing procedure of the enlargement and reduction percentage generation processing according to the fourth embodiment of the present technique.

FIG. 12 is a flowchart showing an example of the processing procedure of the enlargement and reduction percentage generation processing according to the fourth embodiment of the present technique.

The detection of a scene change is the same as that of the second or third embodiment. Specifically, with respect to one of a plurality of images included in a bit stream, detection processing for detecting a presence/absence of a scene change is carried out by the scene change detection section 144 (Step S911). Upon detecting a scene change (Step S912: Yes), the enlargement and reduction percentage determination section 145 initializes the enlargement and reduction percentage to "1.0-fold" (Step S918).

When a scene change is not detected (Step S912: No), a resolution is acquired by the image information acquisition section 130 (Step S913) as in the first embodiment, and the enlargement and reduction percentage is calculated by the enlargement and reduction percentage operation section 141 based on the resolution (Step S914). When the enlargement and reduction percentage calculated by the enlargement and reduction percentage operation section 141 is within a predetermined range (Step S915: Yes), the enlargement and reduction percentage calculated by the enlargement and reduction percentage operation section 141 is determined as the enlargement and reduction percentage to be instructed to the image enlargement and reduction section 150 (Step S917).

When the enlargement and reduction percentage calculated by the enlargement and reduction percentage operation section 141 us not within the predetermined range (Step S915: No), it is judged whether the event that the enlargement and reduction percentage is outside the range is temporary (Step S916). When it is judged that the event is not temporary (Step S916: No), the enlargement and reduction percentage determination section 145 initializes the enlargement and reduction percentage to "1.0-fold" (Step S918). On the other hand, when it is judged as temporary (Step S916: Yes), the enlargement and reduction percentage calculated by the enlargement and reduction percentage operation section 141 is determined as the enlargement and reduction percentage to be instructed to the image enlargement and reduction section 150 (Step S917).

The enlargement and reduction percentage calculated by the enlargement and reduction percentage operation section 141 is stored in the enlargement and reduction percentage storage section 143 to be used for the judgment on a next image (Step S916) (Step S919).

Those processing are sequentially repeated in time series for the plurality of images included in the bit stream.

[Timing of Image Conversion Processing]

A case where a resolution largely changes in the interlace image 7B input at the time T6 in FIG. 7 described above, for example, will be discussed. Even when the enlargement and reduction percentage at this time exceeds the predetermined range, the enlargement and reduction percentage is not initialized at once in the fourth embodiment. Then, when the enlargement and reduction percentage in the interlace image 8T input at the next time T7 has returned to that before the interlace image 6T input at the time T5, it is interpreted that the fluctuation of the enlargement and reduction percentage is temporary, and the enlargement and reduction percentage is not initialized.

On the other hand, when the change of the enlargement and reduction percentage continues also in the interlace image 8T input at the time T7, it is interpreted that the fluctuation of the enlargement and reduction percentage is not temporary, and the enlargement and reduction percentage determination section 145 initializes the enlargement and reduction percentage to "1.0-fold".

As described above, according to the fourth embodiment, by carrying out the hysteresis operation when the enlargement and reduction percentage calculated by the enlargement and reduction percentage operation section 141 is not within the predetermined range, unnecessary initialization of the enlargement and reduction percentage can be suppressed.

It should be noted that the embodiments described above are described as an example for embodying the present technique, and the items of the embodiments and the invention specification items in the claims have correspondence relationships. Similarly, the invention specification items in the claims and the items in the embodiments of the present technique having the same name as those of the claims have correspondence relationships. It should be noted that the present technique is not limited to the embodiments above and can be embodied by various modifications without departing from the gist of the present technique.

Moreover, the processing procedures described in the embodiments above may be grasped as a method including those series of procedures or may be grasped as a program for causing a computer to execute the series of procedures or a recording medium that stores the program. Examples of the recording medium include a CD (Compact Disc), an MD (Mini Disc), a DVD (Digital Versatile Disc), a memory card, and a Blu-ray (registered trademark) Disc.

It should be noted that the present technique may also take the following structures.

(1) An image processing apparatus, including:
  a resolution acquisition section that acquires a resolution of each of a plurality of temporally-consecutive images;
  an enlargement and reduction percentage generation section that generates an enlargement and reduction percentage for each of the plurality of images based on the acquired resolution;
  an image enlargement and reduction section that performs image enlargement and reduction processing on each of the plurality of images according to the generated enlargement and reduction percentage; and
  an image conversion section that performs image conversion processing on each of the plurality of images subjected to the image enlargement and reduction processing.

(2) The image processing apparatus according to (1) above, further including
  a position detection section that detects a position at which a correlation degree is lowered in the plurality of images,
  in which the enlargement and reduction percentage generation section initializes the enlargement and reduction percentage at the position at which the correlation degree is lowered.

(3) The image processing apparatus according to (1) or (2) above,
  in which the enlargement and reduction percentage generation section initializes the enlargement and reduction percentage when the enlargement and reduction percentage based on the acquired resolution exceeds a predetermined range.

(4) The image processing apparatus according to (3) above, further including
  an enlargement and reduction percentage storage section that stores a history of the generated enlargement and reduction percentage,
  in which the enlargement and reduction percentage generation section generates, even when the enlargement and reduction percentage based on the acquired resolution exceeds the predetermined range, the enlargement and reduction percentage without initialization when it is judged that the state exceeding the predetermined range is temporary based on the history of the enlargement and reduction percentage stored in the enlargement and reduction percentage storage section.

(5) The image processing apparatus according to any one of (1) to (4) above,
  in which the image conversion section performs the image conversion processing that uses each of the plurality of images as a target image by referencing, when other images temporally close to the target image have a correlation with the target image, the target image and the other images, and performs the image conversion processing by interpolating the target image when the other images have no correlation with the target image.

(6) The image processing apparatus according to any one of (1) to (5) above,
  in which each of the plurality of images is an interlace image, and
  in which the image conversion section includes, as the image conversion processing, processing of converting the interlace image into a progressive image.

(7) The image processing apparatus according to any one of (1) to (6) above,
  in which the image conversion section includes, as the image conversion processing, processing of reducing noises for each of the plurality of images.

(8) An image processing method, including:
  a resolution acquisition step of acquiring a resolution of each of a plurality of temporally-consecutive images;
  an enlargement and reduction percentage generation step of generating an enlargement and reduction percentage for each of the plurality of images based on the acquired resolution;
  an image enlargement and reduction step of performing image enlargement and reduction processing on each of the plurality of images according to the generated enlargement and reduction percentage; and
  an image conversion step of performing image conversion processing on each of the plurality of images subjected to the image enlargement and reduction processing.

DESCRIPTION OF REFERENCE NUMERALS

10 stream storage section.
17 moving image generation section
20 processor
30 memory
40 OSD generation. section
50 image superimposition section
60 display section
11, 110 demultiplexer
12, 120 decoder 130 image information acquisition section
140 enlargement and reduction percentage generation section
141 enlargement and reduction percentage operation section
142 reference resolution storage section
143 enlargement and reduction percentage storage section
144 scene change detection section
145 enlargement and reduction percentage determination section
15, 150 image enlargement and reduction section
16, 160 image conversion section

The invention claimed is:

1. An image processing apparatus, comprising:
a resolution acquisition section that acquires a resolution of each of a plurality of temporally-consecutive images;
an enlargement and reduction percentage generation section that generates an enlargement and reduction percentage for each of the plurality of images based on the acquired resolution;
an image enlargement and reduction section that performs image enlargement and reduction processing on each of the plurality of images according to the generated enlargement and reduction percentage;
an image conversion section that performs image conversion processing on each of the plurality of images subjected to the image enlargement and reduction processing; and
a position detection section that detects a position at which a correlation degree is lowered in the plurality of images,
wherein the enlargement and reduction percentage generation section initializes the enlargement and reduction percentage at the position at which the correlation degree is lowered.

2. The image processing apparatus according to claim 1, wherein the enlargement and reduction percentage generation section initializes the enlargement and reduction percentage when the enlargement and reduction percentage based on the acquired resolution exceeds a predetermined range.

3. The image processing apparatus according to claim 2, further comprising:
an enlargement and reduction percentage storage section that stores a history of the generated enlargement and reduction percentage,
wherein the enlargement and reduction percentage generation section generates, even when the enlargement and reduction percentage based on the acquired resolution exceeds the predetermined range, the enlargement and reduction percentage without initialization when it is judged that the state exceeding the predetermined range is temporary based on the history of the enlargement and reduction percentage stored in the enlargement and reduction percentage storage section.

4. The image processing apparatus according to claim 1, wherein the image conversion section performs the image conversion processing that uses each of the plurality of images as a target image by referencing, when other images temporally close to the target image have a correlation with the target image, the target image and the other images, and performs the image conversion processing by interpolating the target image when the other images have no correlation with the target image.

5. The image processing apparatus according to claim 1, wherein each of the plurality of images is an interlace image, and
wherein the image conversion section includes, as the image conversion processing, processing of converting the interlace image into a progressive image.

6. The image processing apparatus according to claim 1, wherein the image conversion section includes, as the image conversion processing, processing of reducing noises for each of the plurality of images.

7. An image processing method, comprising:
a resolution acquisition step of acquiring a resolution of each of a plurality of temporally-consecutive images;
an enlargement and reduction percentage generation step of generating an enlargement and reduction percentage for each of the plurality of images based on the acquired resolution;
an image enlargement and reduction step of performing image enlargement and reduction processing on each of the plurality of images according to the generated enlargement and reduction percentage;
an image conversion step of performing image conversion processing on each of the plurality of images subjected to the image enlargement and reduction processing; and
a position detection step of detecting a position at which a correlation degree is lowered in the plurality of images,
wherein the enlargement and reduction percentage generation step initializes the enlargement and reduction percentage at the position at which the correlation degree is lowered.

8. The image processing method according to claim 7, wherein the enlargement and reduction percentage generation step initializes the enlargement and reduction percentage when the enlargement and reduction percentage based on the acquired resolution exceeds a predetermined range.

* * * * *